(12) United States Patent
Lin

(10) Patent No.: US 9,862,438 B2
(45) Date of Patent: Jan. 9, 2018

(54) BICYCLE STAND

(71) Applicant: Cheng-Feng Lin, Changhua (TW)

(72) Inventor: Cheng-Feng Lin, Changhua (TW)

( * ) Notice: Subject to any disclaimer, the term of this patent is extended or adjusted under 35 U.S.C. 154(b) by 0 days.

(21) Appl. No.: 15/367,572

(22) Filed: Dec. 2, 2016

(65) Prior Publication Data

US 2017/0158272 A1    Jun. 8, 2017

(30) Foreign Application Priority Data

Dec. 4, 2015 (TW) .............................. 104219546 U
Aug. 1, 2016 (TW) .............................. 105211568 U

(51) Int. Cl.
*B62M 1/00* (2010.01)
*B62H 3/00* (2006.01)
*B62M 3/16* (2006.01)

(52) U.S. Cl.
CPC ................ *B62H 3/00* (2013.01); *B62M 1/00* (2013.01); *B62M 3/16* (2013.01)

(58) Field of Classification Search
CPC ... B62H 3/00; B62H 1/00; B62H 1/20; B62H 1/06; B62H 2700/00; B62H 2700/005; B62M 3/16
USPC .. 248/351, 346.03, 346.01, 127, 158, 163.1, 248/431, 164, 440.1, 170, 435, 440
See application file for complete search history.

(56) References Cited

U.S. PATENT DOCUMENTS

| | | | | |
|---|---|---|---|---|
| 617,028 A | * | 1/1899 | Koehler | B62H 1/00 |
| | | | | 211/17 |
| 622,642 A | * | 4/1899 | Tomlinson | B62H 3/00 |
| | | | | 211/195 |
| 748,387 A | * | 12/1903 | Lilly | B65F 1/1415 |
| | | | | 248/436 |
| 1,128,248 A | * | 2/1915 | Hetzel | B05B 15/062 |
| | | | | 248/85 |
| 1,508,392 A | * | 9/1924 | Heun | E06C 7/48 |
| | | | | 182/214 |
| 1,670,029 A | * | 5/1928 | Fetter | A22B 5/06 |
| | | | | 248/164 |
| 1,731,139 A | * | 10/1929 | Kift | A47G 7/041 |
| | | | | 248/149 |
| 2,663,101 A | * | 12/1953 | Olander | D06F 81/04 |
| | | | | 108/117 |
| 2,912,775 A | * | 11/1959 | Gettelman | D06F 81/04 |
| | | | | 108/117 |
| 3,980,320 A | * | 9/1976 | Marchello | B62H 1/00 |
| | | | | 211/22 |
| 4,563,016 A | * | 1/1986 | Holleron, Jr. | B62H 1/02 |
| | | | | 280/293 |
| 4,723,741 A | * | 2/1988 | Doering | B65B 67/1255 |
| | | | | 248/164 |

(Continued)

*Primary Examiner* — Nkeisha Smith
(74) *Attorney, Agent, or Firm* — Leong C. Lei

(57) ABSTRACT

The bicycle stand includes a first rod, a second rod, and a pivot structure. The first rod has a first end, a second end, and a first pivot portion between the first end and the second end. The second rod has a third end, a fourth end, and a second pivot portion between the third end and the fourth end. The pivot structure is pivotally connected to the first pivot portion and the second pivot portion so that the first rod is pivotally connected with the second rod and is able to pivot between a folding position and an opening position. The first rod and the second rod are X-shaped when the first rod and the second rod are at the opening position.

9 Claims, 9 Drawing Sheets

(56) References Cited

U.S. PATENT DOCUMENTS

| | | | | |
|---|---|---|---|---|
| 4,763,865 A * | 8/1988 | Danner | ............... | F16M 11/38 108/118 |
| 5,299,510 A * | 4/1994 | Mattesky | ............... | D06F 81/04 108/117 |
| 5,360,194 A * | 11/1994 | Jacobson | ............... | F16M 11/242 248/300 |
| 5,421,115 A * | 6/1995 | McKay | ............... | F41A 23/12 248/163.1 |
| 5,452,872 A * | 9/1995 | Barnes | ............... | B05B 15/062 248/168 |
| 5,492,230 A * | 2/1996 | Horton | ............... | A63B 55/10 211/196 |
| 5,857,649 A * | 1/1999 | Eason | ............... | F16M 11/38 248/164 |
| 6,334,593 B2 * | 1/2002 | Inoue | ............... | B65B 67/1205 248/95 |
| 6,508,443 B1 * | 1/2003 | Andreasson | ............... | B65B 67/1205 220/9.4 |
| 6,923,416 B1 * | 8/2005 | Hsieh | ............... | F16M 11/38 108/118 |
| 6,976,593 B2 * | 12/2005 | Fierstein | ............... | B62H 3/10 211/17 |
| 7,077,368 B1 * | 7/2006 | Karoly | ............... | B65H 49/32 242/598.3 |
| D547,018 S * | 7/2007 | Henderson | ............... | D32/66 |
| 7,318,569 B1 * | 1/2008 | Bilotta | ............... | B65B 67/1205 248/164 |
| 7,368,647 B2 * | 5/2008 | Hsieh | ............... | F16M 11/38 248/164 |
| 7,575,207 B2 * | 8/2009 | Chuang | ............... | B62H 1/06 248/168 |
| 8,292,239 B1 * | 10/2012 | Elden Limb | ............... | B65B 67/1205 248/163.2 |
| 8,596,597 B1 * | 12/2013 | Spicer | ............... | F16M 11/38 15/230.11 |
| 8,851,301 B1 * | 10/2014 | Ho | ............... | B62H 3/04 211/20 |
| 9,481,427 B2 * | 11/2016 | Ko | ............... | B62H 1/08 |
| 9,644,785 B2 * | 5/2017 | Carpenter | ............... | F16M 11/24 |
| 2007/0164173 A1 * | 7/2007 | Li | ............... | B65F 1/1415 248/97 |
| 2007/0175369 A1 * | 8/2007 | Reiner | ............... | A47B 3/02 108/118 |
| 2008/0054131 A1 * | 3/2008 | Joy | ............... | B60R 11/00 248/127 |
| 2016/0338486 A1 * | 11/2016 | Martin | ............... | A47B 9/16 |

\* cited by examiner

BICYCLE STAND

BACKGROUND OF THE INVENTION

Field of the Invention

The present invention relates to a bicycle stand.

Description of the Prior Art

A conventional bicycle stand is a rod having an end pivotally connected to the bicycle. When riding the bicycle, the rod is pivoted toward the bicycle. When parking the bicycle, the rod is pivoted outward so that the free end of the rod is able to stand on the ground. However, the bicycle stand is usually located near the pedal, so the user may be hurt by the bicycle stand when riding. Besides, if the user forgets to reset the bicycle stand, it results danger to the rider. On the other hand, the bicycle stand is a part of the bicycle so as to gain the weight of the bicycle.

Thus, most of professional bicycles have no bicycle stands. The bicycle without bicycle stands can be positioned only by leaning against the wall or the ground. Thus, the bicycle is possible to be damaged, and the pedestrian may be hurt by the bicycle when the bicycle falls.

SUMMARY OF THE INVENTION

The main object of the present invention is to provide a bicycle stand which is easy to detach and install.

To achieve the above and other objects, the bicycle stand of the present invention includes a first rod, a second rod, and a pivot structure. The first rod has a first end and a second end. The first rod has a first pivot portion between the first end and the second end. The second rod has a third end and a fourth end. The second rod has a second pivot portion between the third end and the fourth end. The pivot structure is pivotally connected to the first pivot portion and the second pivot portion so that the first rod is pivotally connected with the second rod and is able to pivot between a folding position and an opening position. The first rod and the second rod overlap when the first rod and the second rod are at the folding position. The first rod and the second rod are X-shaped when the first rod and the second rod are at the opening position. When the first rod and the second rod are at the opening position, the first end of the first rod and the third end of the second rod are adapted for being inserted through a pedal of a bicycle. The pivot structure abuts against the pedal. The second end of the first rod and the fourth end of the second rod are adapted for standing on ground to support the bicycle.

Thereby, the bicycle stand of the present invention is easy to install or detach, and has a small size when folded. In addition, the bicycle stand can used as handtools too.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
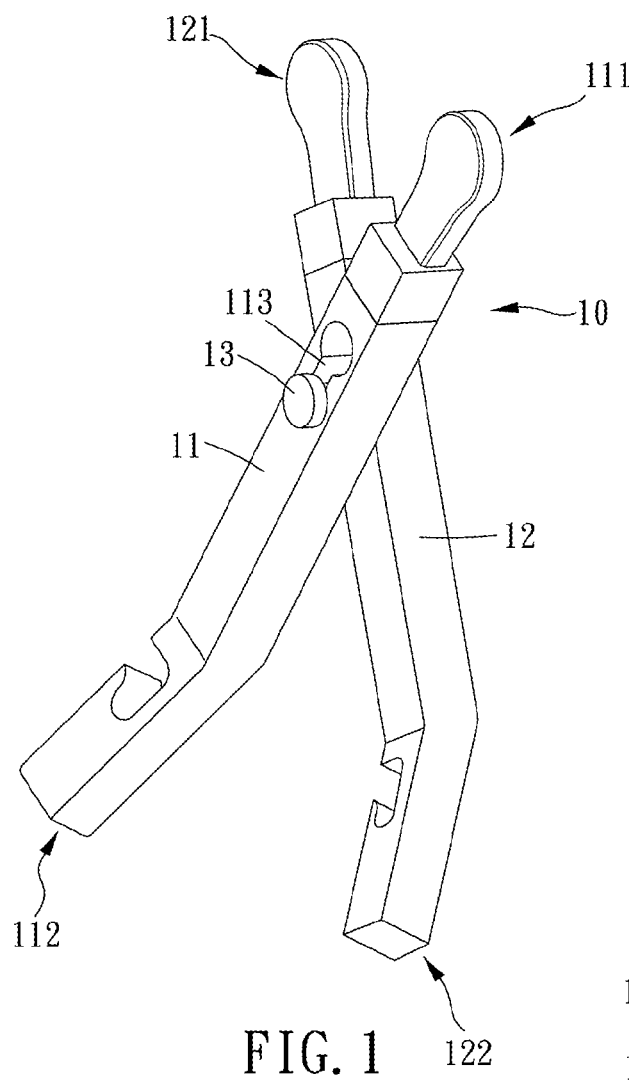
FIG. 1 is a stereogram of the present invention at an opening position.

Please refer to FIGS. 1 to 11, the bicycle stand 10,10a of the present invention includes a first rod 11,11a, a second rod 12,12a, and a pivot structure 13. The first rod 11,11a has a first end 111,111a and a second end 112,112a. The first rod 11,11a further has a first pivot portion between the first end 111,111a and the second end 112,112a. The second rod 12,12a has a third end 121,121a and a fourth end 122,122a. The second rod 12,12a further has a second pivot portion between the third end 121,121a and the fourth end 122,122a. The pivot structure 13 is pivotally connected to the first pivot portion and the second pivot portion so that the first rod 11,11a and the second rod 12,12a are pivotally connected to be pivotable between a folding position and an opening position. When the first rod 11,11a and the second rod 12,12a are at the folding position, the first rod 11,11a and the second rod 12,12a overlap to be substantially parallel to each other. When the first rod 11,11a and the second rod 12,12a are at the opening position, they are X-shaped, and the first end 111,111a of the first rod 11,11a and the third end 121,121a of the second rod 12,12a are adapted for being inserted through a pedal 20 of a bicycle 30. At the same time, the second end 112,112a of the first rod 11,11a and the fourth end 122,122a of the second rod 12,12a are adapted for standing on the ground to support the bicycle 30.

More specifically, the first pivot portion includes a pivot hole 113,113a. The pivot hole 113,113a includes a larger hole 1131,1131a and a smaller hole 1133,1133a. The pivot hole 113,113a further includes an elongated hole 1132, 1132a connecting the larger hole 1131,1131a and the smaller hole 1133,1133a therebetween. The internal diameter of the larger hole 1131,1131a is larger than the internal diameter of the smaller hole 1133,1133a, and the internal diameter of the smaller hole 1133,1133a is larger than the width of the elongated hole 1132,1132a. The pivot structure 13 includes a pin 131 and a compression spring 132. The pin 131 has a larger head portion 1313 and a terminal portion. The pin 131 further has a connecting section 1312 between the head portion 1313 and the terminal portion. The connecting section 1312 has two opposite side faces which are cutting surfaces. The connecting section 1312 has a smaller diameter between the two side faces. The terminal portion of the pin 131 is connected to the second pivot portion. The compression spring 132 is sleeved onto the connecting section 1312. The first rod 11,11a is sleeved onto the pin 131 with the larger hole 1131,1311a, and then the connecting section 1312 is moved to the smaller hole 1133,1133a via the elongated hole 1132,1132a. At this time, the head portion 1313 abuts against the first rod 11,11a, and the compression spring 132 is biased between the first rod 11,11a and the second rod 12,12a. The two side faces of the connecting section 1312 define a minimum diameter of the connecting section 1312 therebetween. The connecting section 1312 further has a maximum diameter. The maximum diameter of the connecting section 1312 is larger than the width of the elongated hole 1132,1132a. The minimum diameter of the connecting section 1312 is smaller than the width of the elongated hole 1132,1132a. Preferably, the second pivot portion can be a threaded hole 123,123a, and the terminal portion of the pin 131 can be a threaded section 1311. The threaded section 1311 is screwed with the threaded hole 123,123a. The two side faces of the connecting section 1312 of the pin 131 face the third end 121,121a and the fourth end 122,122a of the second rod 12,12a respectively. In other possible embodiments, the second pivot portion can be a through hole, and the terminal portion of the pin is inserted through the through hole and is riveted to the through hole. Optionally, the pin can be inserted through the through hole and positioned by a C-shaped or E-shaped buckle piece. Besides, each of the second end 112,112a of the first rod 11,11a and the fourth end 122,122a of the second rod 12,12a has a bending portion 115,115a,125,125a. The two bending portions 115,115a,125,125a bend toward the same direction to stand on the ground more firmly.

Specifically, only when the first rod 11,11a and the second rod 12,12a are perpendicular to each other, the connecting section 1312 of the pin 131 is able to enter the elongated hole 1132,1132a. Thus, only when the first rod 11,11a and the second rod 12,12a are perpendicular to each other, the first rod 11,11a and the second rod 12,12a are able to be separated or combined. Thereby, the first rod 11,11a and the second rod 12,12a are prevented from accidentally separating at the folding position or the opening position.

Figure 12:
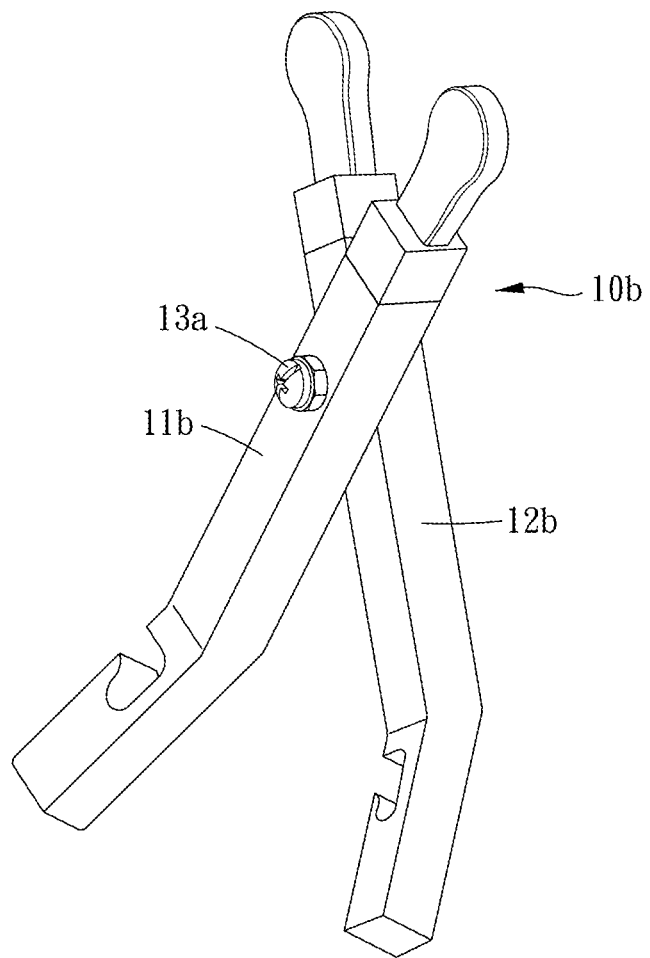
FIG. 12 is a stereogram showing a third embodiment of the present invention.
Figure 13:
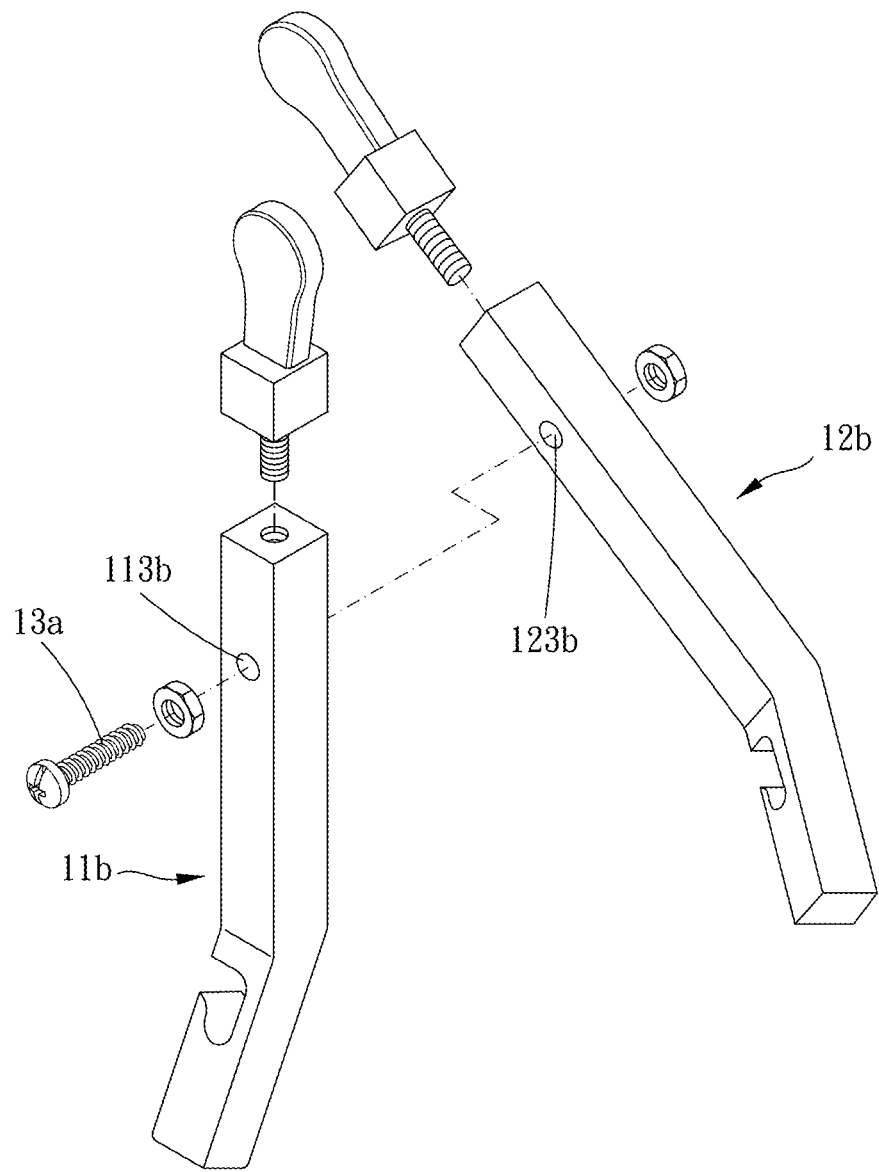
FIG. 13 is a breakdown drawing showing a third embodiment of the present invention.

In the other embodiment of the present invention, the bicycle stand 10b is shown in FIGS. 12 and 13. The first pivot portion of the first rod 11b and the second pivot portion of the second rod 12b can be holes 113b,123b. The pivot structure 13a includes a threaded rod and a nut. The threaded rod is inserted through the two holes 113b,123b and positioned by the nut so that the first rod 11b and the second rod 12b are pivotally connected.

Figure 2:
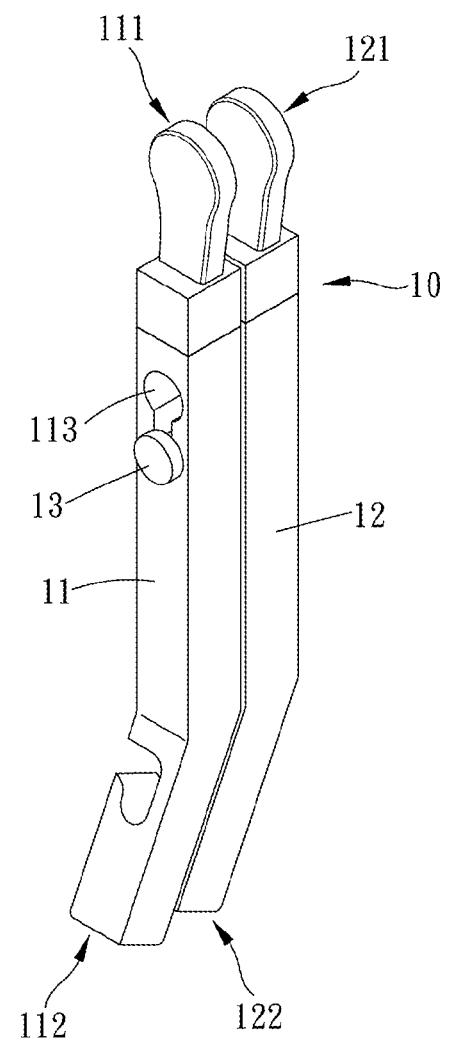
FIG. 2 is a stereogram of the present invention at a folding position.
Figure 3:
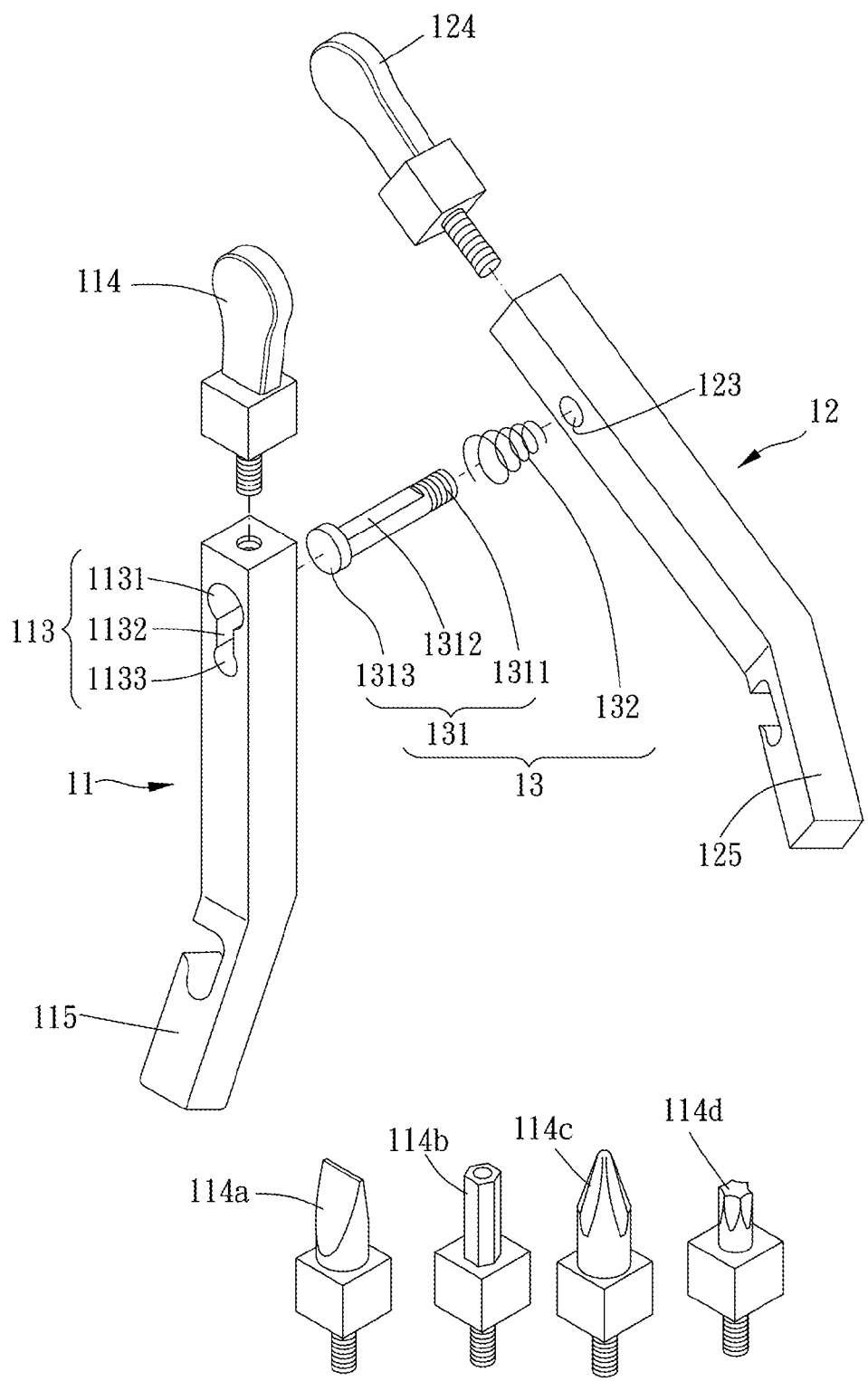
FIG. 3 is a breakdown drawing of the present invention.
Figure 4:
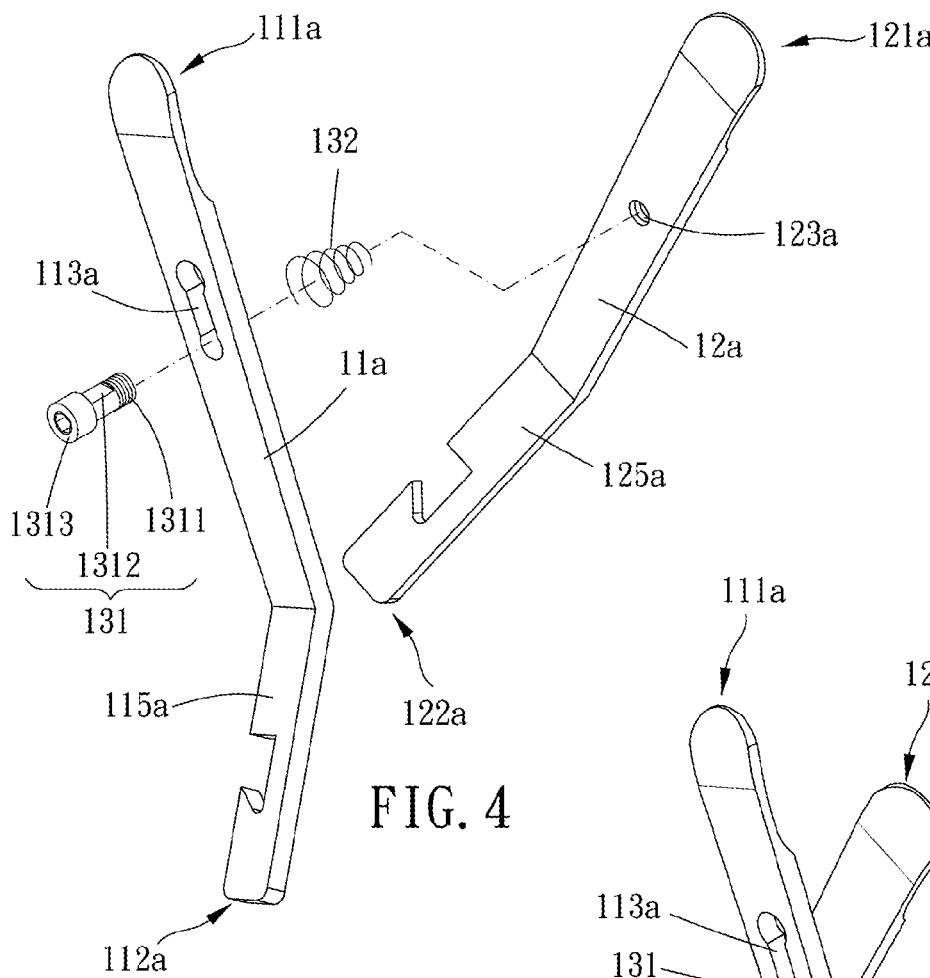
FIG. 4 is a stereogram showing a second embodiment of the present invention.
Figure 5:
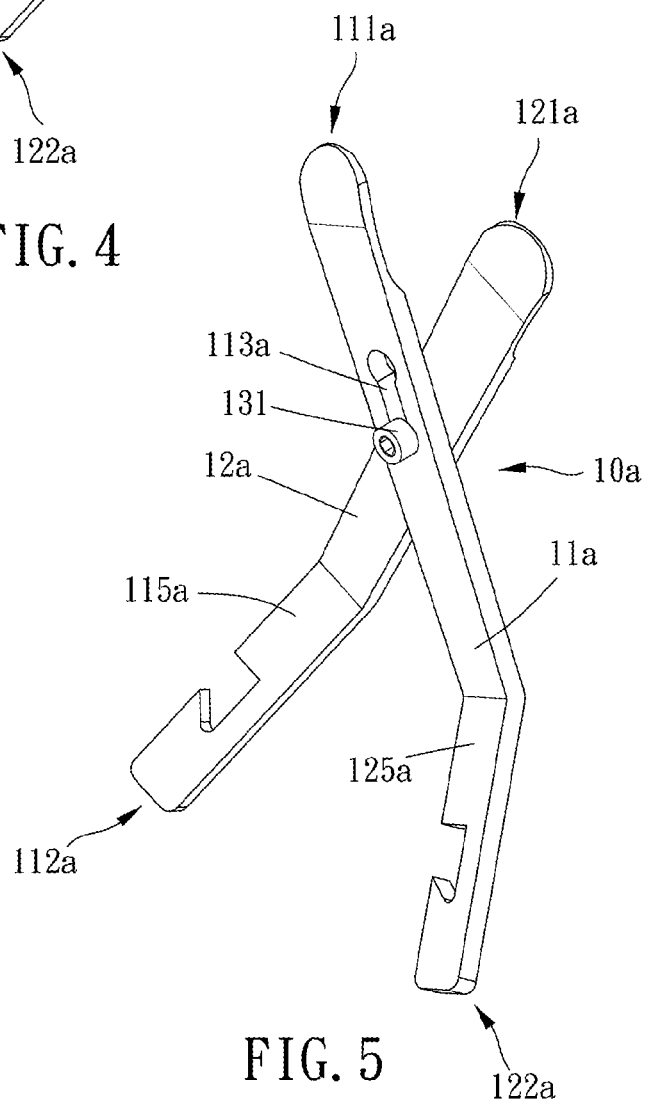
FIG. 5 is a breakdown drawing showing a second embodiment of the present invention.
Figure 6:
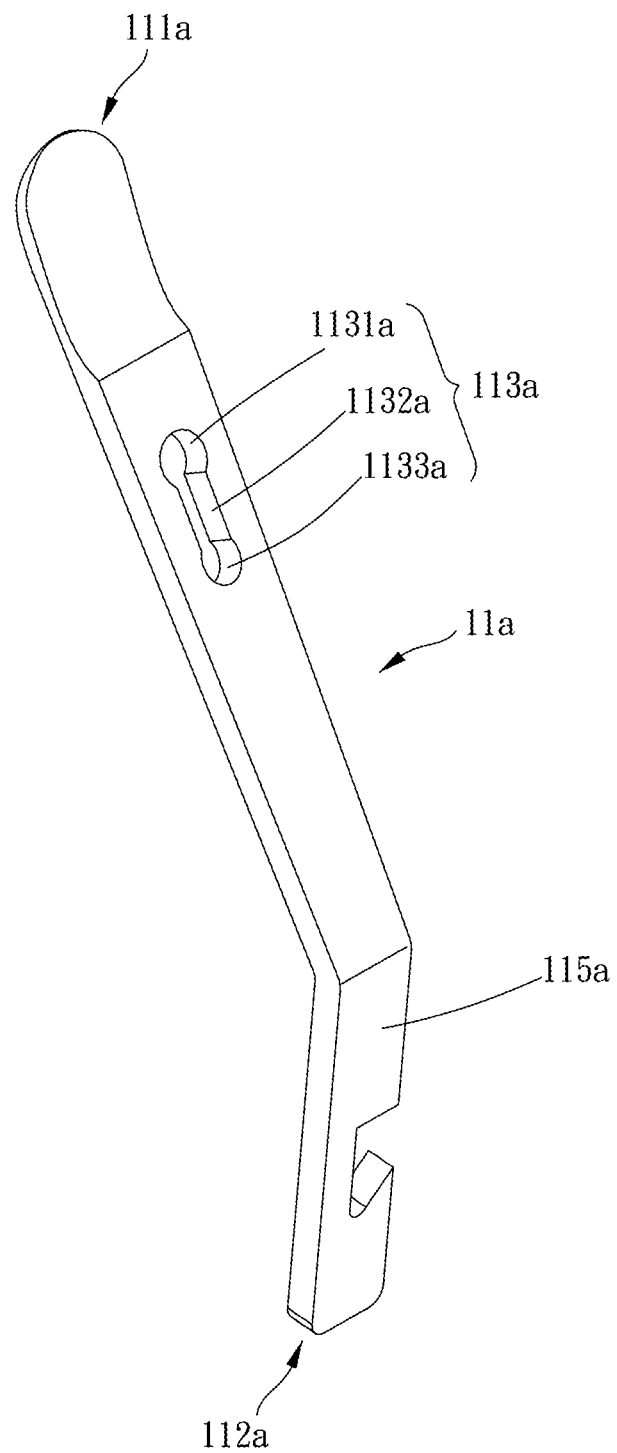
FIG. 6 is a stereogram showing a second embodiment of the present invention at a folding position.
Figure 7:
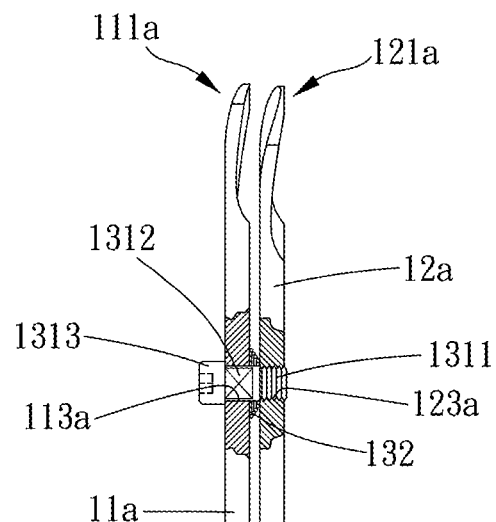
FIG. 7 is a lateral view showing a second embodiment of the present invention.
Figure 8:
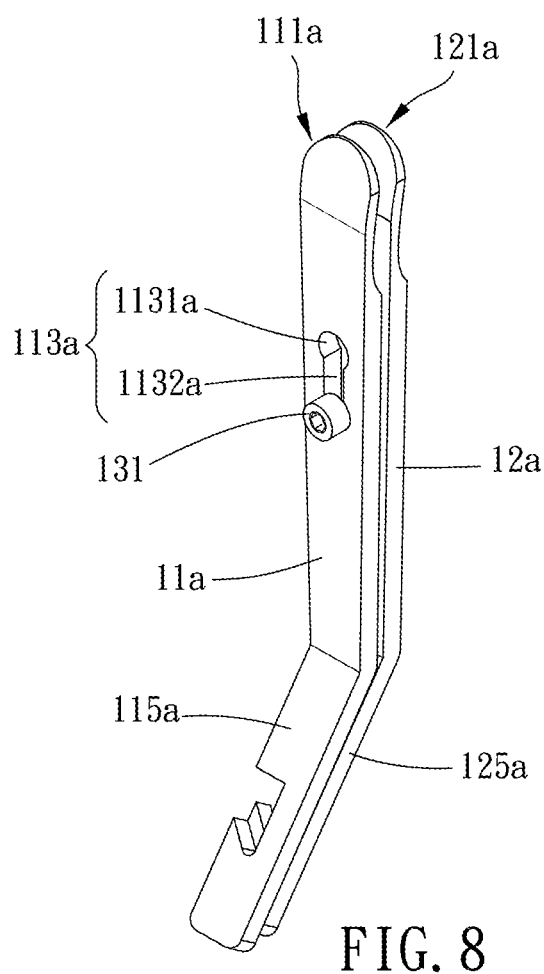
FIG. 8 is a stereogram showing a second embodiment of the present invention at an opening position.

On the other hand, the first rod 11,11a has a tool portion 114,114a,114b,114c,114d at the first end 111,111a, and the second rod 12,12a also has a tool portion 124 at the third end 121,121a. As shown in FIGS. 1 to 3, each of the tool portions 114,114a,114b,114c,114d,124 is detachably disposed on the first rod 11 or the second rod 12. Alternatively, as shown in FIGS. 4 to 8, each of the tool portions is formed as a single piece with the first rod 11a or the second rod 12a. Practically, each tool portion 114,114a,114b,114c,114d,124 can be a tire spoon or a bit head.

In the preferable embodiments, the first rod 11,11a and the second rod 12,12a are plate-shaped or square column-shaped. Preferably, the first rod 11,11a and the second rod 12,12a are made of metal.

Figure 9:
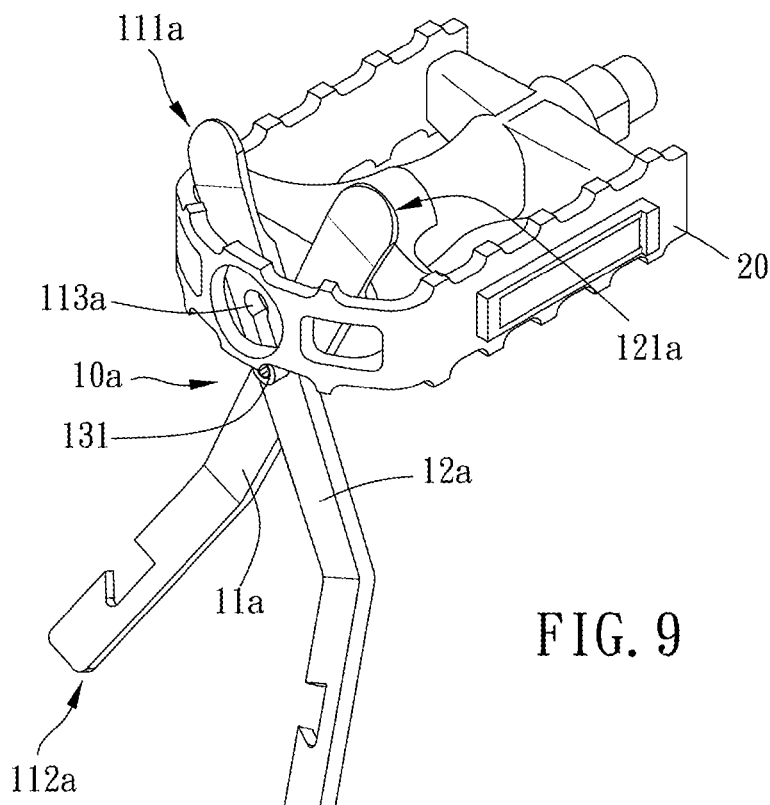
FIGS. 9 to 11 are illustrations showing a second embodiment of the present invention.
Figure 10:
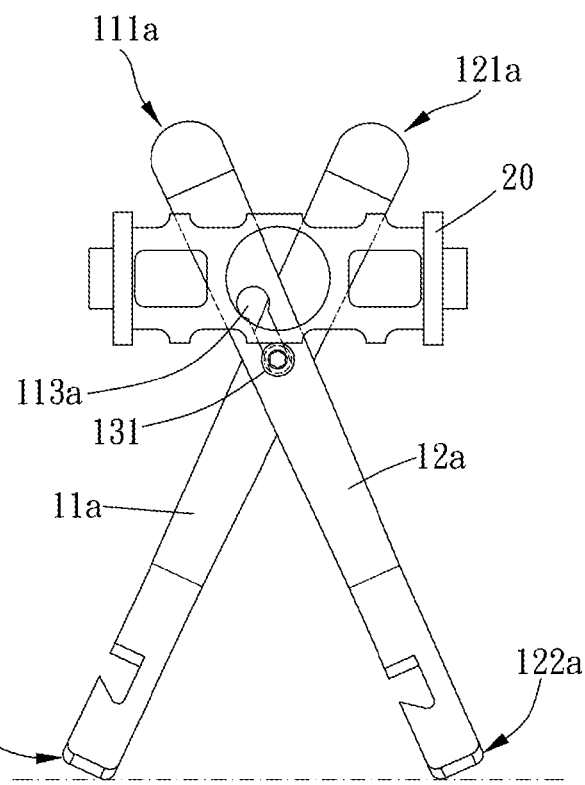
Figure 11:
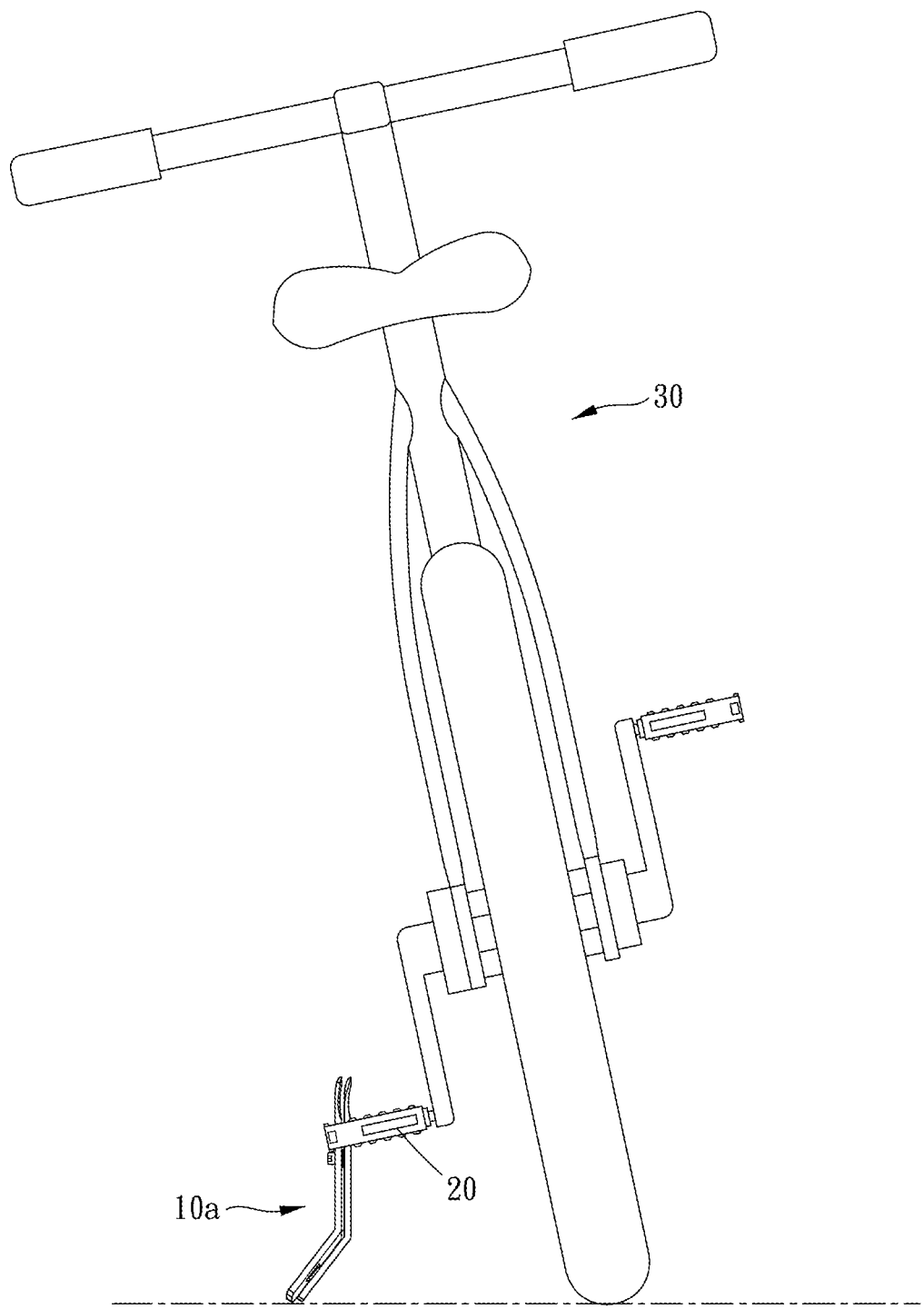

In use, as shown in FIGS. 9 to 11, pivot the first rod 11a and the second rod 12a to the opening position, and insert the first end 111a of the first rod 11a and the third end 121a of the second rod 12a into the hollow portion of the pedal 20 so that the first end 111a and the third end 121a lean against the pedal 20. And then, make the second end 112a of the first rod 11a and the fourth end 122a of the second rod 12a stand on the ground. The terminal end of the pedal 20 abuts against the head portion of the pin 131. Thus, a triangular support is formed by the first end, the third end, and the pin, and another triangular support is formed by the second end, the fourth end, and the pin. Before riding, detach the bicycle stand 10a from the pedal 20, and pivot the first rod 11a and the second rod 12a to the folding position so that the bicycle stand 10a can be carried-on. In addition, the first rod 11a can be detached from the second rod 12a. Thus, the first rod 11a and the second rod 12a can be used as handtools respectively, such as tire spoons. After using, combine the first rod 11a and the second rod 12a again for the bicycle stand.

In conclusion, the bicycle stand of the present invention may not gain bicycle's weight, and the rider may not be hurt by the bicycle stand when riding. In addition, the simple structure is easy to install and use, and is possible to be folded and carried-on. Furthermore, the bicycle stand can be used as handtool too.

What is claimed is:

1. A bicycle stand, including a first rod, a second rod, and a pivot structure, the first rod having a first end and a second end, the first rod having a first pivot portion between the first end and the second end, the second rod having a third end and a fourth end, the second rod having a second pivot portion between the third end and the fourth end, the pivot structure being pivotally connected to the first pivot portion and the second pivot portion so that the first rod is pivotally connected with the second rod and is able to pivot between a folding position and an opening position, the first rod and the second rod overlapping when the first rod and the second rod are at the folding position, the first rod and the second rod being X-shaped when the first rod and the second rod are at the opening position;

wherein when the first rod and the second rod are at the opening position, the first end of the first rod and the third end of the second rod are adapted for being inserted through a pedal of a bicycle, the pivot structure abuts against the pedal, the second end of the first rod and the fourth end of the second rod are adapted for standing on ground to support the bicycle;

wherein the first pivot portion includes a pivot hole, the pivot hole includes a larger hole, a smaller hole, and an elongated hole between the larger hole and the smaller hole, an internal diameter of the larger hole is larger than an internal diameter of the smaller hole, the internal diameter of the smaller hole is larger than a width of the elongated hole, the pivot structure includes a pin and a compression spring, the pin includes a larger head portion and a terminal portion, the pin further has a connecting section between the head portion and the terminal portion, the connecting section has two opposite side faces which are cutting surfaces so that the connecting section has a smaller external diameter between the two side faces, the terminal portion of the pin is connected to the second pivot portion, the compression spring is sleeved onto the connecting section, the first rod is sleeved onto the pin with the larger hole, thereafter the connecting section is moved to the smaller hole via the elongated hole, the head portion abuts against the first rod, the compression spring is biased between the first rod and the second rod.

2. The bicycle stand of claim 1, wherein the second pivot portion is a threaded hole, the terminal portion of the pin is a threaded section, the threaded section is screwed with the threaded hole, the two side faces of the connecting section of the pin face the third end and the fourth end respectively.

3. The bicycle stand of claim 1, wherein the second pivot portion is a through hole, the terminal portion of the pin is inserted into the through hole and is riveted to the through hole, the two side faces of the connecting section of the pin face the third end and the fourth end respectively.

4. The bicycle stand of claim 1, wherein the connecting section defines a minimum diameter between the two side faces which are cutting surfaces, the connecting section further has a maximum diameter, the maximum diameter of the connecting section is larger than the width of the elongated hole, the minimum diameter of the connecting section is smaller than the width of the elongated hole.

5. The bicycle stand of claim 1, wherein each of the first end of the first rod and the third end of the second rod has a tool portion.

6. The bicycle stand of claim 5, wherein each tool portion is tire spoon or a bit head.

7. The bicycle stand of claim 5, wherein each tool portion is detachably disposed on the first rod or the second rod.

8. The bicycle stand of claim 1, wherein the first rod has a bending portion at the second end, the second rod has a bending portion at the fourth end, the two bending portions bend toward a same direction.

9. The bicycle stand claim 1, wherein the each of the first pivot portion and the second pivot portion is a hole, the pivot structure includes a threaded rod and a nut.

\* \* \* \* \*